US012623466B2

(12) United States Patent
Nakano

(10) Patent No.: US 12,623,466 B2
(45) Date of Patent: *May 12, 2026

(54) IMAGE FORMING APPARATUS

(71) Applicant: KYOCERA Document Solutions Inc., Osaka (JP)

(72) Inventor: Jun Nakano, Osaka (JP)

(73) Assignee: Kyocera Document Solutions, Inc.

( * ) Notice: Subject to any disclaimer, the term of this patent is extended or adjusted under 35 U.S.C. 154(b) by 123 days.

This patent is subject to a terminal disclaimer.

(21) Appl. No.: 18/694,953

(22) PCT Filed: Sep. 27, 2022

(86) PCT No.: PCT/JP2022/035970

§ 371 (c)(1), (2) Date: Mar. 22, 2024

(87) PCT Pub. No.: WO2023/054371

PCT Pub. Date: Apr. 6, 2023

(65) Prior Publication Data

US 2025/0001768 A1 Jan. 2, 2025

(30) Foreign Application Priority Data

Sep. 28, 2021 (JP) ................................ 2021-157557

(51) Int. Cl.
*B41J 2/21* (2006.01)

(52) U.S. Cl.
CPC ........... *B41J 2/2142* (2013.01); *B41J 2/2139* (2013.01)

(58) Field of Classification Search
CPC ...... B41J 2/2142; B41J 2/2139; B41J 2/0451; B41J 2/16579; B41J 2/04505; B41J 2029/3935; B41J 2/2135; B41J 2/2146; B41J 29/393; B41J 2/01; B41J 2/04508
See application file for complete search history.

(56) References Cited

U.S. PATENT DOCUMENTS

| | | | | |
|---|---|---|---|---|
| 12,325,234 | B2 * | 6/2025 | Nakano | B41J 2/2146 |
| 2004/0104951 | A1 | 6/2004 | Shibata et al. | |
| 2019/0152219 | A1 | 5/2019 | Heidelberger | |
| 2021/0001638 | A1 | 1/2021 | Shibata | |

FOREIGN PATENT DOCUMENTS

| | | |
|---|---|---|
| JP | 2004-058282 | 2/2004 |
| JP | 2019-093713 | 6/2019 |
| WO | 2019-188911 | 3/2019 |

* cited by examiner

*Primary Examiner* — Jannelle M Lebron

(57) ABSTRACT

A first test pattern includes first bands respectively corresponding to nozzle groups of which each includes nozzles with a first interval such that the first band includes thin lines respectively corresponding to the nozzles. A second test pattern includes second bands respectively corresponding to nozzle subgroups of which each includes nozzles with a second interval in each nozzle group such that the second band includes thin blank lines respectively corresponding to the nozzle and a correction process is performed for adjacent pixels of the thin blank lines. Regarding a first band including density defect detected in a scanned image of the printed first test pattern, in a scanned image of the printed second test pattern, detected as an ink ejection malfunction nozzle is a nozzle corresponding to the thin blank line in the second band not including density defect among the second bands corresponding to the plural nozzle subgroups of the first band.

3 Claims, 7 Drawing Sheets

IMAGE FORMING APPARATUS

TECHNICAL FIELD

The present invention relates to an image forming apparatus.

BACKGROUND ART

An image forming apparatus includes a recording head in which plural nozzles are arranged, and detects an ink droplet hitting position and an ink droplet hitting area of each nozzle and thereby measures a deviation value of an ink ejection malfunction nozzle and generates a nozzle profile, and performs a correction process based on the nozzle profile (see PATENT LITERATURE #1, for example).

CITATION LIST

Patent Literature

PATENT LITERATURE #1: Japanese Patent Application Publication No. 2004-58282.

SUMMARY OF INVENTION

Technical Problem

However, in the aforementioned image forming apparatus, in order to measure the aforementioned deviation value, an image scanning device of a high resolution such as 4800 dpi is required and results in a high cost of the apparatus.

The present invention has been conceived in view of the aforementioned problem. It is an object of the present invention to obtain an image forming apparatus that properly detects an ink ejection malfunction nozzle with a relatively low cost.

Solution to Problem

An image forming apparatus according to the present invention includes a recording head that ejects ink corresponding to an image to be printed, using arranged nozzles; and an ink-ejection-malfunction-nozzle detecting unit configured to detect an ink ejection malfunction nozzle among the nozzles. Further, the ink-ejection-malfunction-nozzle detecting unit (a) sets plural nozzle groups so as to be shifted sequentially by one nozzle such that each of the plural nozzle groups includes nozzles with a predetermined first interval among the arranged nozzles, (b) prints using the recording head a first test pattern that includes first bands respectively corresponding to the nozzle groups such that the first band includes thin lines respectively corresponding to the nozzles in the nozzle group, (c) sets plural nozzle subgroups so as to be shifted sequentially by one nozzle such that each of the plural nozzle subgroups includes nozzles with a predetermined second interval among the nozzles in each of the nozzle groups, (d) prints using the recording head a second test pattern that includes second bands respectively corresponding to the nozzle subgroups such that the second band includes thin blank lines respectively corresponding to the nozzles in the nozzle subgroup and a correction process is performed for adjacent pixels of the thin blank lines, (e) acquires a scanned image of the printed first test pattern and a scanned image of the printed second test pattern, (f) detects a first band including density defect in the scanned image of the first test pattern, and (g) detects a second band not including density defect owing to the correction process in the scanned image of the second test pattern, among the plural second bands corresponding to the plural nozzle subgroups in the nozzle group of the detected first band and detects as the ink ejection malfunction nozzle a nozzle corresponding to the thin blank line in the second band not including density defect.

Advantageous Effect of Invention

By means of the present invention, obtained is an image forming apparatus that properly detects an ink ejection malfunction nozzle with a relatively low cost.

These and other objects, features and advantages of the present invention will become more apparent upon reading of the following detailed description along with the accompanied drawings.

DESCRIPTION OF EMBODIMENTS

Hereinafter, an embodiment according to aspects of the present invention will be explained with reference to a drawing.

Figure 1:
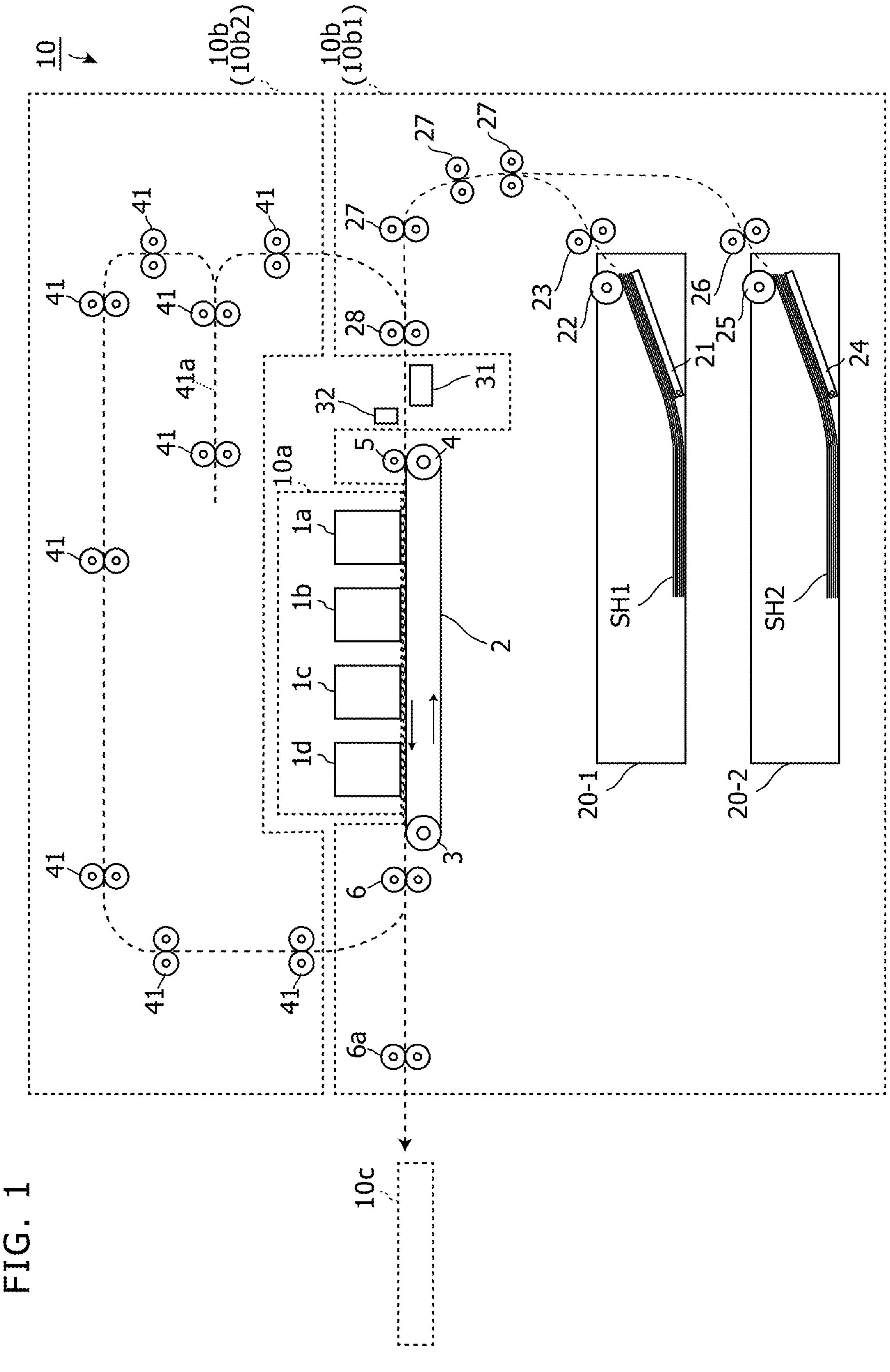
FIG. 1 shows a side view that indicates an internal mechanical configuration of an image forming apparatus in an embodiment according to the present invention.

FIG. 1 shows a side view that indicates an internal mechanical configuration of an image forming apparatus in an embodiment according to the present invention. The image forming apparatus 10 in this embodiment is an apparatus such as printer, copier, facsimile machine or multi function peripheral.

The image forming apparatus 10 shown in FIG. 1 includes a print engine 10*a* and a sheet transportation unit 10*b*. The print engine 10*a* physically forms an image to be printed on a print sheet (print paper sheet or the like). In this embodiment, the print engine 10*a* is a line-type inkjet print engine.

In this embodiment, the print engine 10*a* includes line-type recording heads 1*a* to 1*d* corresponding to four ink colors: Cyan, Magenta, Yellow, and Black.

Figure 2:
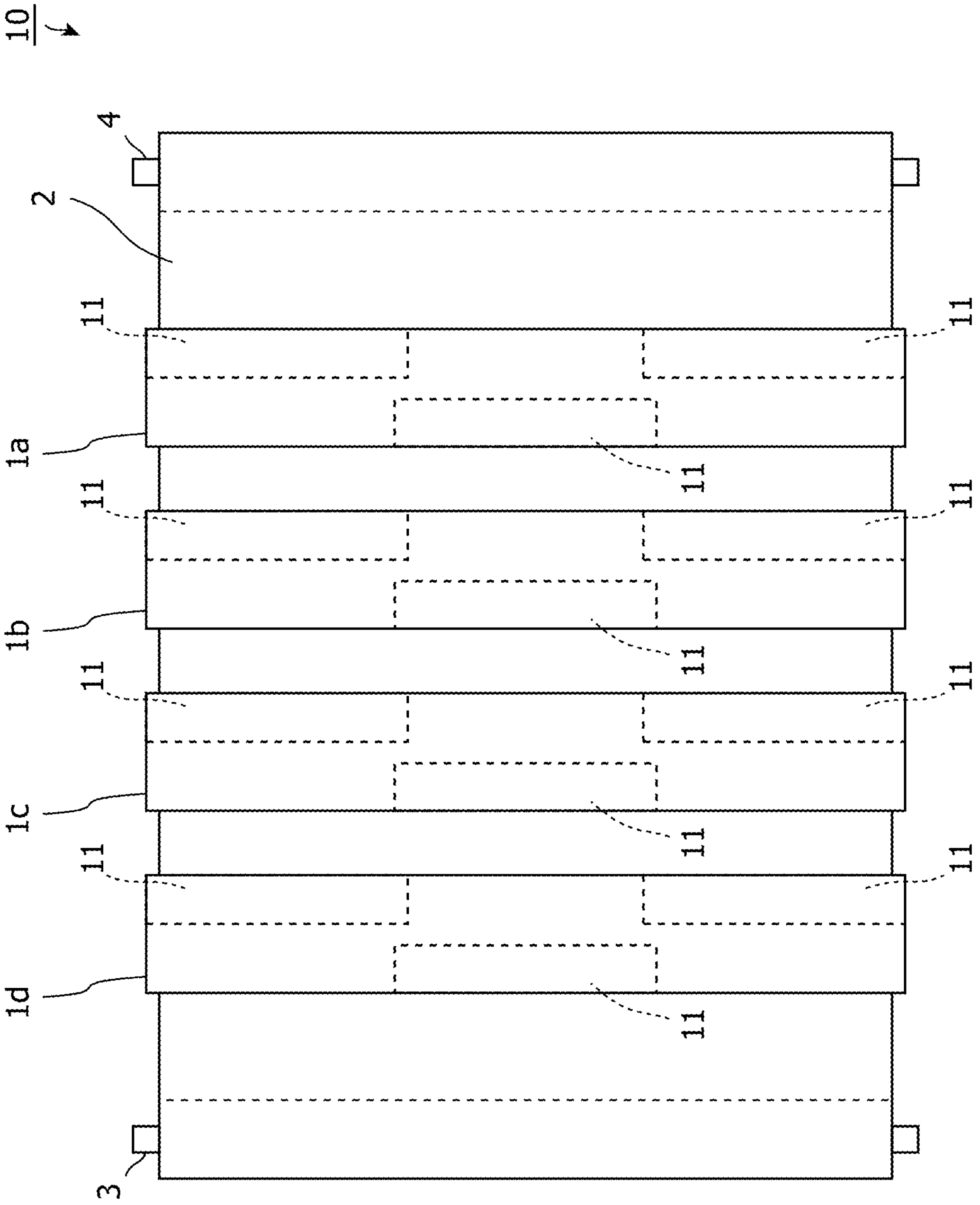
FIG. 2 shows a plane view of an example of recording heads 1*a* to 1*d* in the image forming apparatus 10 shown in FIG. 1.

FIG. 2 shows a plane view of an example of recording heads 1*a* to 1*d* in the image forming apparatus 10 shown in FIG. 1. As shown in FIG. 2, for example, in this embodiment, each of the inkjet recording units 1*a*, 1*b*, 1*c* and 1*d* includes plural (here, three) head units 11. The head units 11 are arranged along a primary scanning direction, and are capable of being mounted to and demounted from a main body of the image forming apparatus. Each of the inkjet recording units 1*a*, 1*b*, 1*c* and 1*d* may include only one head unit 11. The head unit 11 of the inkjet recording unit 1*a*, 1*b*, 1*c* or 1*d* includes 2-dimensionally arranged nozzles, and ejects ink corresponding to the image to be printed using the nozzles.

The sheet transportation unit 10*b* transports the print sheet to the print engine 10*a* along a predetermined transportation path, and transports the print sheet after printing from the print engine 10*a* to a predetermined output destination (here, an output tray 10*c* or the like).

The sheet transportation unit 10*b* includes a main sheet transportation unit 10*b*1 and a circulation sheet transportation unit 10*b*2. In duplex printing, the main sheet transportation unit 10*b*1 transports to the print engine 10*a* a print sheet to be used for printing of a first-surface page image, and the circulation sheet transportation unit 10*b*2 transports the print sheet from a posterior stage of the print engine 10*a* to a prior stage of the print engine 10*a* with detaining a predetermined number of print sheets.

In this embodiment, the main sheet transportation unit 10*b*1 includes (a) a circular-type transportation belt 2 that is arranged so as to be opposite to the print engine 10*a* and transports a print sheet, (b) a driving roller 3 and a driven roller 4 around which the transportation belt 2 is hitched, (c) a nipping roller 5 that nips the print sheet with the transportation belt 2, and (d) output roller pairs 6 and 6*a*.

The driving roller 3 and the driven roller 4 rotate the transportation belt 2. The nipping roller 5 nips an incoming print sheet transported from a sheet feeding cassette 20-1 or 20-2 mentioned below, and the nipped print sheet is transported by the transportation belt 2 to printing positions of the inkjet recording units 1*a* to 1*d* in turn, and on the print sheet, images of respective colors are printed by the inkjet recording units 1*a* to 1*d*. Subsequently, after the color printing, the print sheet is outputted by the output roller pairs 6 and 6*a* to an output tray 10*c* or the like.

Further, the main sheet transportation unit 10*b*1 includes plural sheet feeding cassettes 20-1 and 20-2. The sheet feeding cassettes 20-1 and 20-2 store print sheets SH1 and SH2, and push up the print sheets SH1 and SH2 using lift plates 21 and 24 so as to cause the print sheets SH1 and SH2 to contact with pickup rollers 22 and 25, respectively. The print sheets SH1 and SH2 put on the sheet feeding cassettes 20-1 and 20-2 are picked up to sheet feeding rollers 23 and 26 by the pickup rollers 22 and 25 sheet by sheet from the upper sides, respectively. The sheet feeding rollers 23 and 26 are rollers that transport the print sheets SH1 and SH2 sheet by sheet fed by the pickup rollers 22 and 25 from the sheet feeding cassettes 20-1 and 20-2 onto a transportation path. A transportation roller 27 is a transportation roller on the transportation path common to the print sheets SH1 and SH2 transported from the sheet feeding cassettes 20-1 and 20-2.

When performing duplex printing, the circulation sheet transportation unit 10*b*2 returns the print sheet from a predetermined position in a downstream side of the print engine 10*a* to a predetermined position in an upstream side of the print engine 10*a* (here, to a predetermined position in an upstream side of a line sensor 31 mentioned below). The circulation sheet transportation unit 10*b*2 includes a transportation roller 41, and a switch back transportation path 41*a* that reverses a movement direction of the print sheet in order to change a surface that should face the print engine 10*a* among surfaces of the print sheet from the first surface to the second surface of the print sheet.

Further, the image forming apparatus 10 includes a line sensor 31 and a sheet detecting sensor 32.

The line sensor 31 is an optical sensor that is arranged along a direction perpendicular to a transportation direction of the print sheet, and detects positions of both end edges (both side edges) of the print sheet. For example, the line sensor 31 is a CIS (Contact Image Sensor). In this embodiment, the line sensor 31 is arranged at a position between the registration roller 28 and the print engine 10*a*.

The sheet detecting sensor 32 is an optical sensor that detects that a top end of the print sheet SH1 or SH2 passes through a predetermined position on the transportation path. The line sensor 31 detects the positions of the both side end edges at a time point that the top end of the print sheet SH1 or SH2 is detected by the sheet detecting sensor 32.

For example, as shown in FIG. 1, the print engine 10*a* is arranged in one of an upward part of the transportation path and a downward part of the transportation path (here, in the upward part); the line sensor 31 is arranged in the other of the upward part of the transportation path and the downward part of the transportation path (here, in the downward part); and the circulation transportation unit 10*b*2 transports the print sheet from the downstream side of the print engine 10*a* to the upstream side of the line sensor 31 with changing an orientation of the print sheet in a switch back manner.

Figure 3:
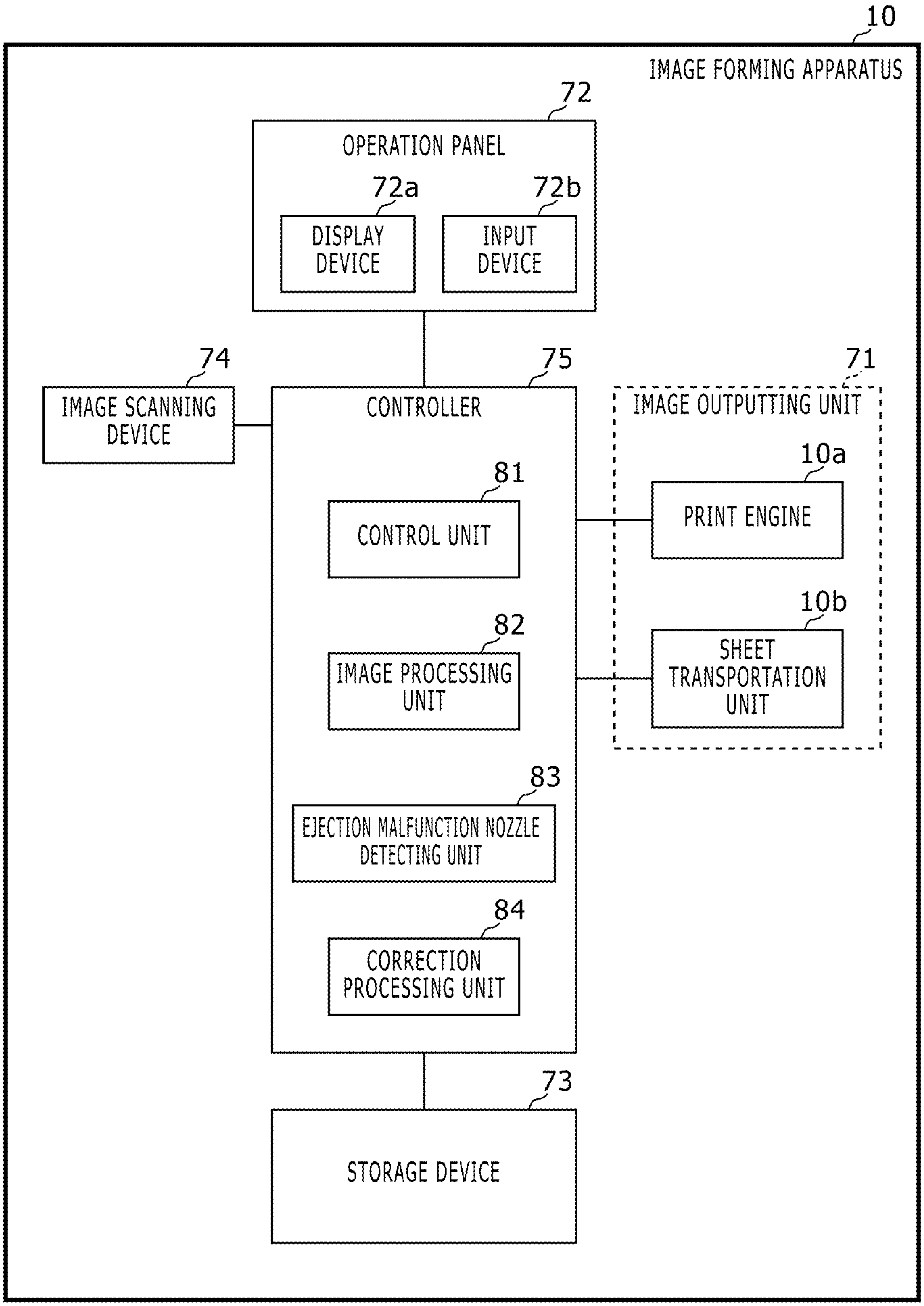
FIG. 3 shows a block diagram that indicates an electronic configuration of the image forming apparatus 10 in the embodiment according to the present invention.

FIG. 3 shows a block diagram that indicates an electronic configuration of the image forming apparatus 10 in the embodiment according to the present invention. As shown in FIG. 3, the image forming apparatus 10 includes not only an image outputting unit 71 that includes the mechanical configuration shown in FIGS. 1 and 2 but an operation panel 72, a storage device 73, an image scanning device 74, and a controller 75.

The operation panel 72 is arranged on a housing surface of the image forming apparatus 10, and includes a display device 72*a* such as a liquid crystal display and an input device 72*b* such as a hard key and/or touch panel, and displays sorts of messages for a user using the display device 72*a* and receives a user operation using the input device 72*b*.

The storage device 73 is a non-volatile storage device (flash memory, hard disk drive or the like) in which data, a program and the like have been stored that are required for control of the image forming apparatus 10.

The image scanning device 74 includes a platen glass and an auto document feeder, and optically scans a document image from a document put on the platen glass or a document fed by the auto document feeder, and generates image data of the document image.

The controller 75 includes a computer that performs a software process in accordance with a program, an ASIC (Application Specific Integrated Circuit) that performs a predetermined hardware process, and/or the like, and acts as sorts of processing units using the computer, the ASIC and/or the like. This computer includes a CPU (Central Processing Unit), a ROM (Read Only Memory), a RAM (Random Access Memory) and the like, and loads a program stored in the storage device 73, the ROM or the like to the RAM and executes the program using the CPU and thereby acts as processing units (with the ASIC if required). Here, the controller 75 acts as a control unit 81, an image processing unit 82, an ink-ejection-malfunction-nozzle detecting unit 83, and a correction processing unit 84.

The control unit 81 controls the image outputting unit 71 (the print engine 10*a*, the sheet transportation unit 10*b* and the like), and thereby performs a print job requested by a user. In this embodiment, the control unit 81 causes the image processing unit 82 to perform a predetermined image process, and controls the print engine 10*a* (the head units 11) and causes the head units 11 to eject ink and thereby forms a print image on a print sheet. The image processing unit 82 performs a predetermined image process such as RIP (Raster Image Processing), color conversion, halftoning and/or the like for image data of a printing image.

Specifically, the control unit 81 causes the print engine 10*a* to print a user document image based on printing image data specified by a user or a test patter mentioned below.

Further, in this embodiment, the control unit 81 has an automatic centering function that (a) determines as an actual sheet center position a center position of a print sheet on the basis of the positions of both side end edges of the print sheet detected by the line sensor 31, and (b) adjusts a center position of an image to be printed, on the basis of a difference from the actual sheet center position, and performs the automatic centering function as a hardware process.

Specifically, in the automatic centering function, the control unit 81 changes a depicting position of the image to be printed, in a primary scanning direction by a difference between a reference center position of the print engine 10*a* and the actual sheet center position. In this embodiment, because the nozzles of the recording heads 1*a* to 1*d* do not move, a nozzle corresponding to each pixel in the image to be printed is changed correspondingly to the depicting position of the image to be printed.

As mentioned, the control unit 81 determines nozzles corresponding to the image to be printed (a nozzle corresponding to each pixel), correspondingly to a position of a print sheet, and causes the recording heads 1*a* to 1*d* to eject ink from the determined nozzles.

The ink-ejection-malfunction-nozzle detecting unit 83 detects an ink ejection malfunction nozzle among nozzles of the recording heads 1*a* to 1*d*.

The ink-ejection-malfunction-nozzle detecting unit 83 (*a*) sets plural nozzle groups so as to be shifted sequentially by one nozzle such that each of the plural nozzle groups includes nozzles with a predetermined first interval among nozzles in each of the recording heads 1*a* to 1*d*, and (b) prints using the recording heads 1*a* to 1*d* a first test pattern that includes first bands respectively corresponding to the nozzle groups such that the first band includes thin lines respectively corresponding to the nozzles in the nozzle group.

Figure 4:
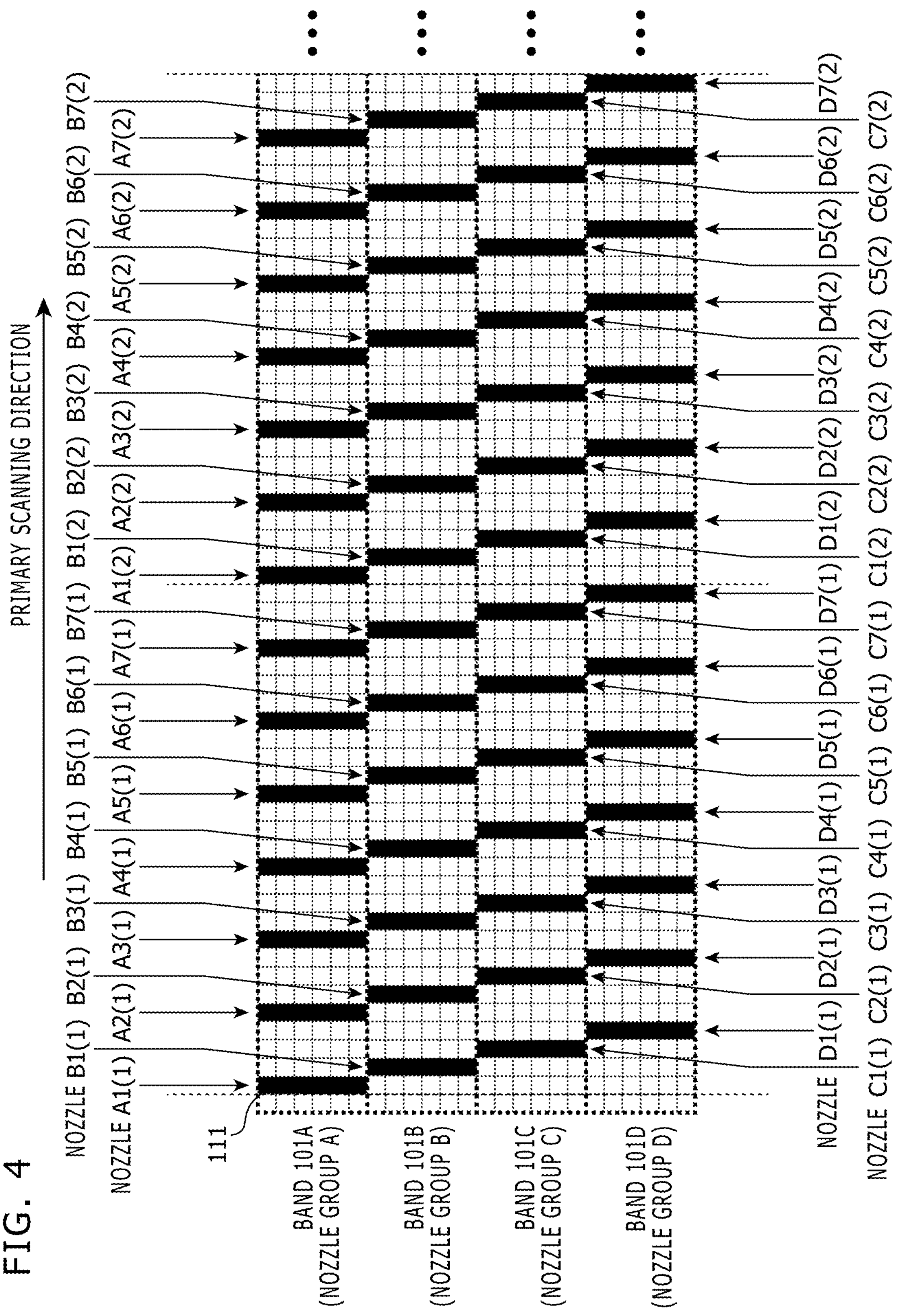
FIG. 4 shows a diagram that indicates an example of a first test pattern.

FIG. 4 shows a diagram that indicates an example of a first test pattern. In a case of the first test pattern shown in FIG. 4, nozzles of each of the recording heads 1*a* to 1*d* are classified into four nozzle groups A, B, C, and D such that each of the nozzle groups includes nozzles with an interval of three nozzles (i.e. the aforementioned predetermined first interval). It should be noted that the first test pattern is not limited to that shown in FIG. 4.

A nozzle Ai(j) in the nozzle group A (i=1, . . . , N1, j=1, . . . , N2; N1 and N2 are constants; N1 is the number of nozzles included by a nozzle subgroup mentioned below; and N2 is a value corresponding to a total number of the nozzles) ejects ink, and thereby a band 101A (i.e. thin lines 111 in the band 101A) is depicted. This thin line 111 is an image having a density that has a primary-scanning-directional width of 1 dot and a secondary-scanning-directional length of Li (here 6 dots). Therefore, ink is not ejected in the remaining part other than these thin lines.

Similarly, a nozzle Bi(j) in the nozzle group B ejects ink and thereby a band 101B is depicted, a nozzle Ci(j) in the nozzle group C ejects ink and thereby a band 101C is depicted, and a nozzle Di(j) in the nozzle group D ejects ink and thereby a band 101D is depicted, Further, the ink-ejection-malfunction-nozzle detecting unit 83 (*c*) sets plural nozzle subgroups so as to be shifted sequentially by one nozzle such that each of the plural nozzle subgroups includes nozzles with a predetermined second interval among the nozzles in each of the nozzle groups, and (d) prints using the recording heads 1*a* to 1*d* a second test pattern that includes second bands respectively corresponding to the nozzle subgroups such that the second band includes thin blank lines respectively corresponding to the nozzles in the nozzle subgroup and a correction process is performed for adjacent pixels of the thin blank lines.

Figure 5:
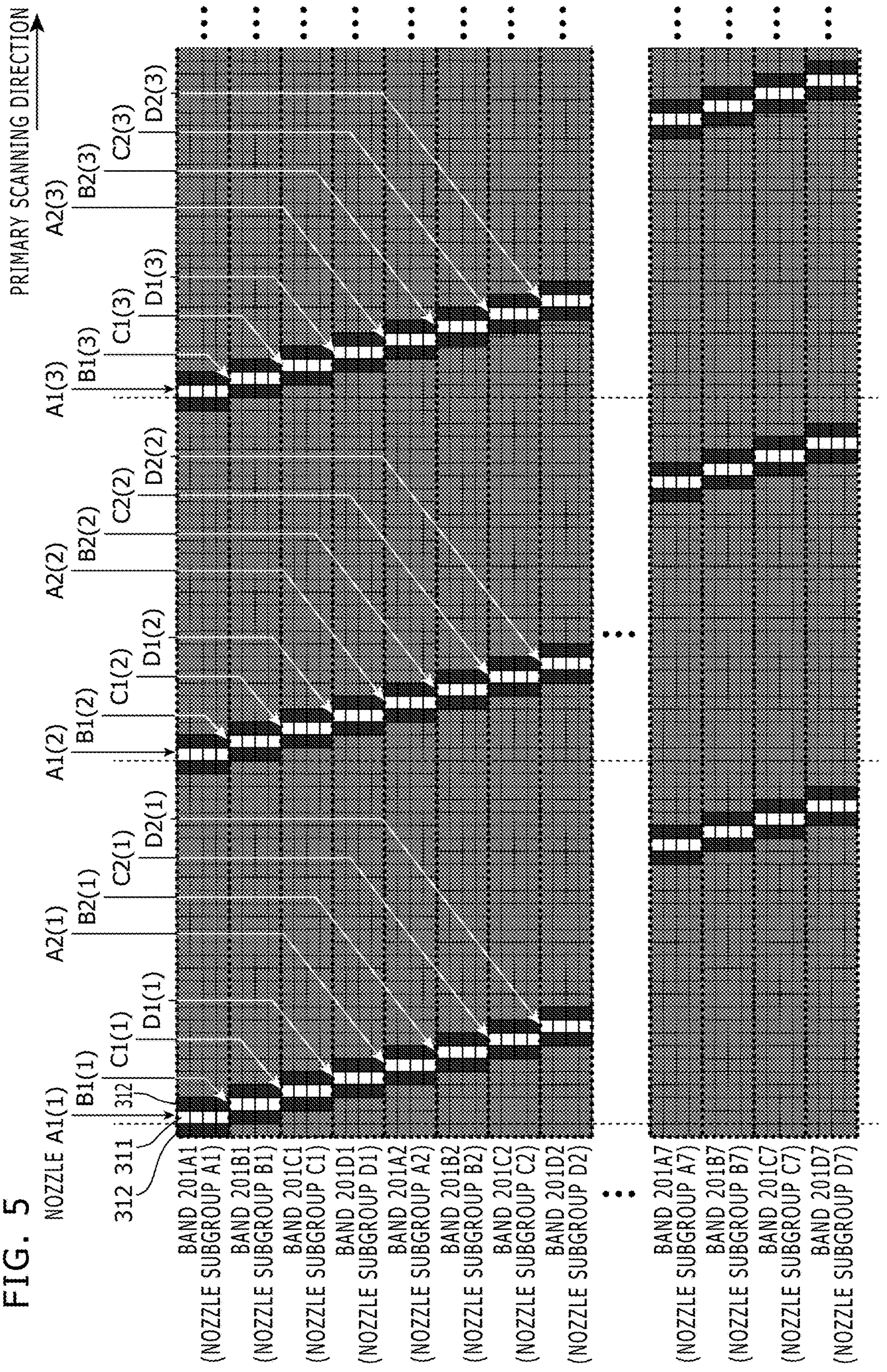
FIG. 5 shows a diagram that indicates an example of a second test pattern.

FIG. 5 shows a diagram that indicates an example of a second test pattern. In a case of the second test pattern shown in FIG. 5, nozzles Ai(j) in the nozzle group A are classified into seven nozzle subgroups A1, . . . , A7 such that each of the nozzle subgroups includes nozzles with an interval of six nozzles (i.e. the aforementioned predetermined second interval). It should be noted that the second test pattern is not limited to that shown in FIG. 5.

Here, in the nozzle subgroup A1, the nozzles A1(*j*) are included among the nozzles Ai(j); in the nozzle subgroup A2, the nozzles A2 (*j*) are included among the nozzles Ai(j); in the nozzle subgroup A3, the nozzles A3(*j*) are included among the nozzles Ai(j); in the nozzle subgroup A4, the nozzles A4 (*j*) are included among the nozzles Ai(j); in the nozzle subgroup A5, the nozzles A5(*j*) are included among the nozzles Ai(j); in the nozzle subgroup A6, the nozzles A6(*j*) are included among the nozzles Ai(j); and in the nozzle subgroup A7, the nozzles A7 (*j*) are included among the nozzles Ai (j).

Similarly, nozzles Bi(j) in the nozzle group B are classified into seven nozzle subgroups B1, . . . , B7 such that each of the nozzle subgroups includes nozzles with an interval of six nozzles. Further, similarly, nozzles Ci(j) in the nozzle group C are classified into seven nozzle subgroups Cl, . . . , C7 such that each of the nozzle subgroups includes nozzles with an interval of six nozzles. Furthermore, similarly, nozzles Di(j) in the nozzle group D are classified into seven nozzle subgroups Dl, . . . , D7 such that each of the nozzle subgroups includes nozzles with an interval of six nozzles.

The second test pattern includes bands 20*l*Al to 201A7 respectively corresponding to the nozzle subgroups A1 to A7, bands 20*l*Bl to 201B7 respectively corresponding to the nozzle subgroups B1 to B7, bands 20*l*Cl to 201C7 respectively corresponding to the nozzle subgroups Cl to C7, and bands 20*l*Dl to 201D7 respectively corresponding to the nozzle subgroups Dl to D7.

Nozzles in the nozzle subgroups A1 to A7 correspond thin blank lines 311 in the bands 20*l*Al to 201A7, respectively; nozzles in the nozzle subgroups B1 to B7 correspond thin blank lines 311 in the bands 20*l*Bl to 201B7, respectively; nozzles in the nozzle subgroups Cl to C7 correspond thin blank lines 311 in the bands 20*l*Cl to 201C7, respectively; and nozzles in the nozzle subgroups Dl to D7 correspond thin blank lines 311 in the bands 20*l*Dl to 201D7, respectively. The thin blank line 311 is an image not having a density that has a primary-scanning-directional width of 1 dot and a secondary-scanning-directional length of L2 (here 4 dots).

The nozzle A1(*j*) in the nozzle subgroup A1 does not eject ink and nozzles other than the nozzle A1(*j*) ejects ink with a predetermined ink amount (of an intermediate gradation level density), and thereby the band 201A is depicted. When depicting the band 201A, an amount of ink ejected (by a nozzle adjacent to the nozzle A1(*j*)) at a pixel 312 adjacent to the thin blank line 311 in the primary scanning direction is increased by the correction process so as to make the thin blank line 311 invisible after printing. The remaining bands 201A2 to 201A7, 201B1 to 201B7, 201C1 to 201C7, and 201D1 to 201D7 are depicted in the same manner.

Furthermore, the ink-ejection-malfunction-nozzle detecting unit 83 (*e*) acquires a scanned image of the first test pattern printed on a print sheet or the like and a scanned image of the second test pattern printed on a print sheet or the like, (f) detects a first band including density defect in the scanned image of the first test pattern, and (g) detects a second band not including density defect owing to the correction process in the scanned image of the second test pattern, among the plural second bands corresponding to the plural nozzle subgroups in the nozzle group of the detected first band and detects as the ink ejection malfunction nozzle a nozzle corresponding to the thin blank line in the second band not including density defect.

The scanned images of these test patterns are acquired using the line sensor 31 or the image scanning device 74. If the line sensor 31 is used for the detection of the ink ejection malfunction nozzle, the print sheet on which the test patterns have been printed are automatically transported to a position of the line sensor 31 and scanned, and the scanned images (image data) of the test patterns are provided to the controller 75. Afterward, the print sheet on which the test patterns have been printed is outputted. If the image scanning device 74 is used instead of the line sensor 31, the print sheet on which the test patterns have been printed is immediately outputted, images of the test patterns are scanned by the image scanning device 74 from the print sheet set on the image scanning device 74 by a user, and the scanned images (image data) of the test patterns are provided to the controller 75.

Figure 6:
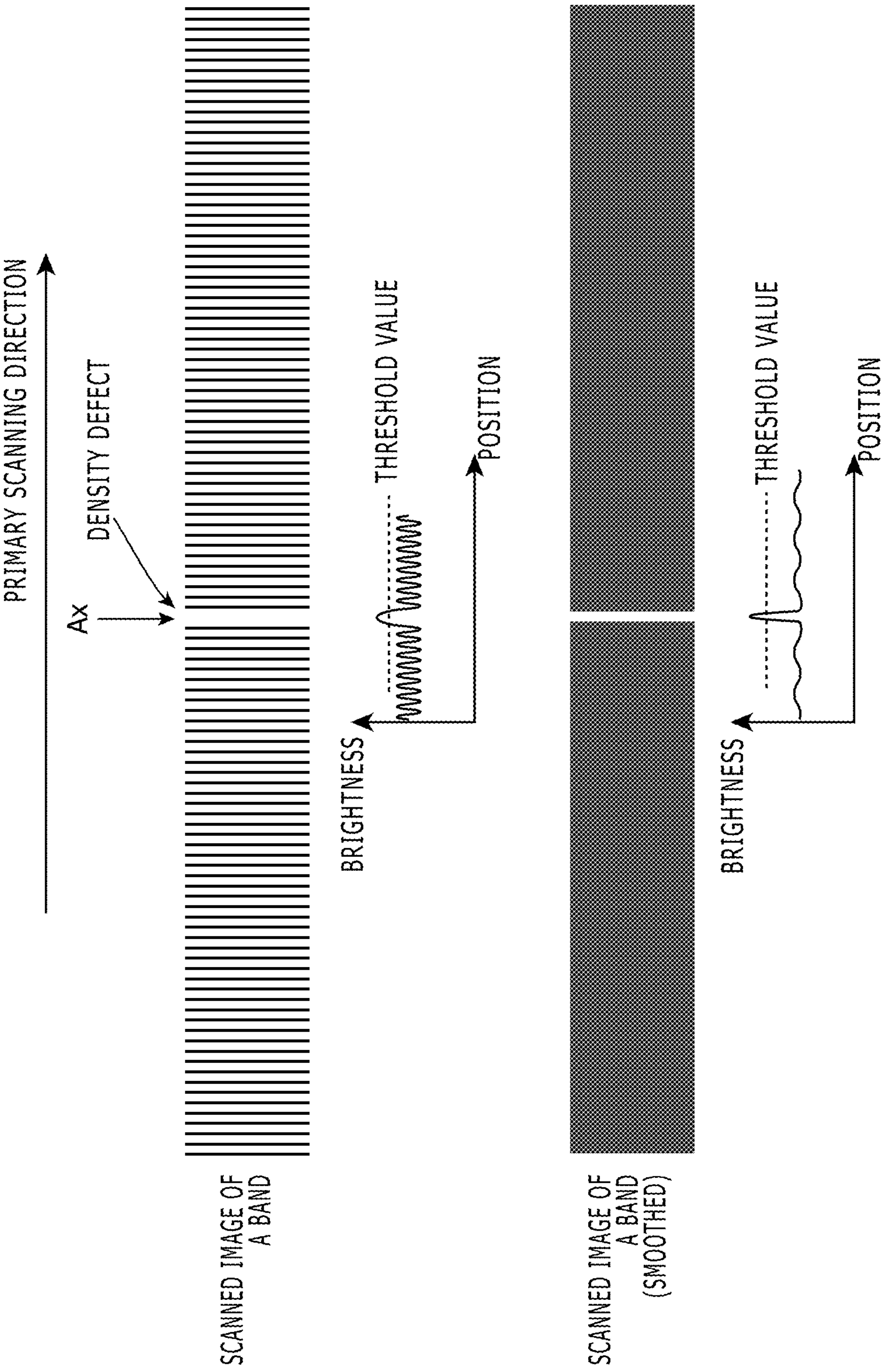
FIG. 6 shows a diagram that explains detection of density defect in a scanned image of the first test pattern.

FIG. 6 shows a diagram that explains detection of density defect in a scanned image of the first test pattern. In this embodiment, the ink-ejection-malfunction-nozzle detecting unit 83 smoothes the scanned image of the first test pattern, and detects the first band including density defect in the smoothed scanned image of the first test pattern.

If an ink ejection malfunction nozzle Ax (a nozzle of which an ink hitting position deviates in the primary scanning direction, or the like) is included in a nozzle group corresponding to a first band, then a density defect appears in a scanned image of this band as shown in FIG. 6, for example. Contrarily, if an ink ejection malfunction nozzle Ax is not included in the nozzle group, then a density defect does not appear in a scanned image of the band corresponding to this nozzle group.

As shown in FIG. 6, specifically, in a brightness distribution of the scanned image of the band, if there is a position of which a brightness exceeds a predetermined threshold value (or a position of which a density in a density distribution is less than a predetermined threshold value), then this position is detected as a position of density defect. If the scanned image of the first test pattern is smoothed, the density defect is easily detected because a brightness difference (density difference) is gained between the position of the density defect and another position.

Figure 7:
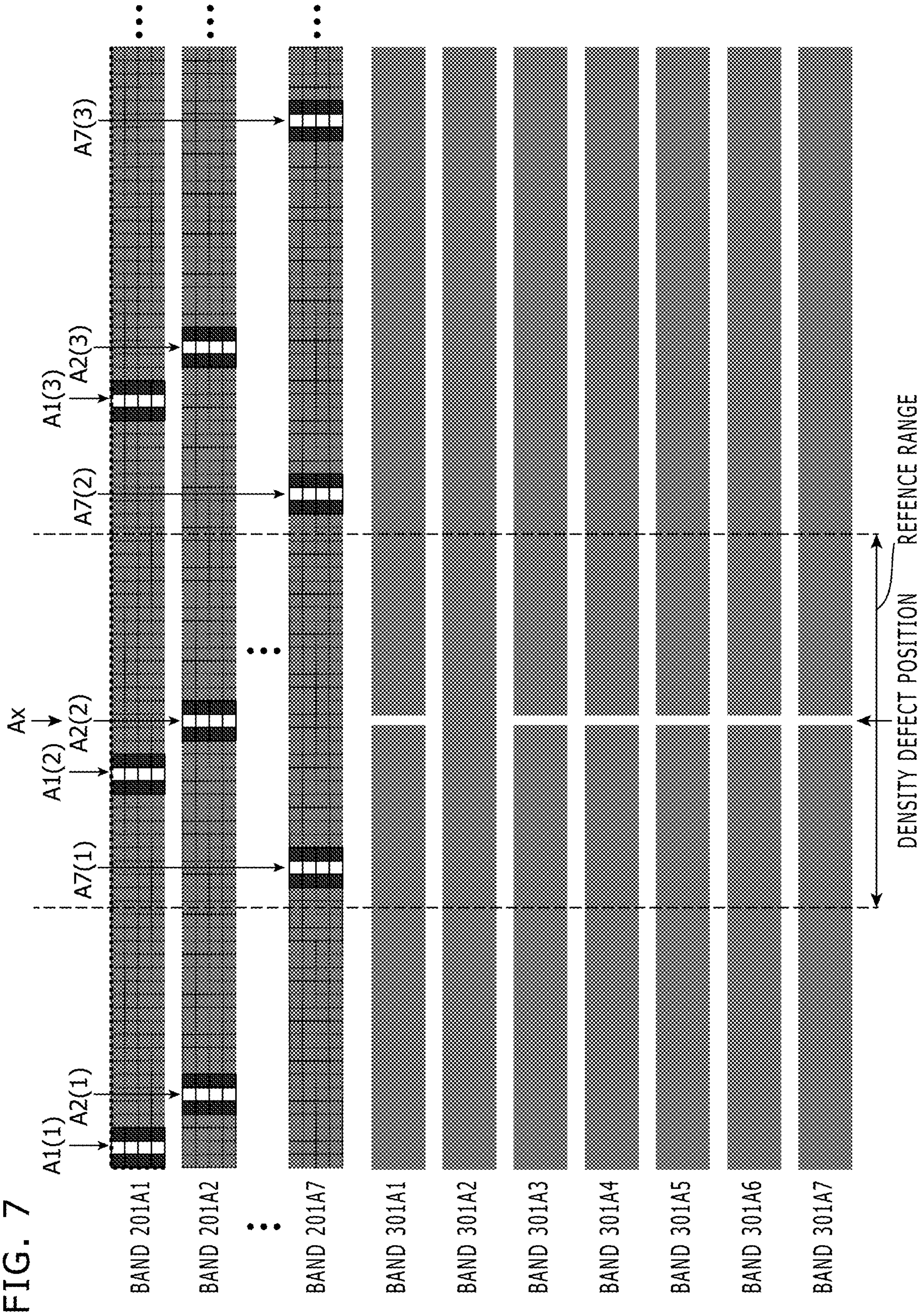
FIG. 7 shows a diagram that explains detection of an ink ejection malfunction nozzle based on a scanned image of the second test pattern.

FIG. 7 shows a diagram that explains detection of an ink ejection malfunction nozzle based on a scanned image of the second test pattern.

For example, in a scanned image of the first test pattern, if density defect is detected in the band 101A, then regarding the corresponding bands 301A1 to 301A7 in a scanned image of the second test pattern, as shown in FIG. 7, density distributions (brightness distributions) of the bands 301A1 to 301A7 are referred in a predetermined primary-scanning-directional range around a position of the aforementioned density defect, and determined is a band 301Ak in which the density defect is not detected (around the density defect position) (in FIG. 7, the band 301A2). Among nozzles in a nozzle subgroup corresponding to the determined band 301Ak, a nozzle in the predetermined range (in FIG. 7, the nozzle A2 (2)) is detected as an ink ejection malfunction nozzle. It should be noted that a width of this predetermined range is set so as to be equal to or less than a period of the thin blank lines 311.

Specifically, if a nozzle of a thin blank line 311 is an ink ejection malfunction nozzle, then the correction process eliminates a blank line due to ink ejection malfunction, and therefore, density defect is not detected in the band. Contrarily, if a nozzle of a thin blank line 311 is not an ink ejection malfunction nozzle, then the correction process does not eliminate a blank line due to ink ejection malfunction and the blank line remains because the thin blank line 311 is located at a position other than a position of the blank line due to ink ejection malfunction, and therefore, density defect is detected in the band.

Returning to FIG. 1, the correction processing unit 84 performs as a hardware process the correction process corresponding to each of the detected ink ejection malfunction nozzle(s) for the image to be printed. In this correction process, for example, image data (pixel value) of a pixel adjacent to a pixel for which an ink ejection malfunction nozzle ejects ink is corrected so as to increase a density of this adjacent pixel.

The following part explains a behavior of the image forming apparatus 10.

(a) Determination of an Ink Ejection Malfunction Position that the Correction Process should be Performed Through the control unit 81, the ink-ejection-malfunction-nozzle detecting unit 83 causes the image outputting unit 71 to print the aforementioned first and second test patterns on a print sheet.

The ink-ejection-malfunction-nozzle detecting unit 83 acquires scanned images (i.e. image data of each ink color) of the first and second test patterns using the line sensor 31 or the image scanning device 74 as mentioned.

Subsequently, the ink-ejection-malfunction-nozzle detecting unit 83 determines whether density defect appears as shown in FIG. 6 in each band in the first test pattern or not, and if there is a band in which density defect appears, then this band is detected.

If there are no bands in which density defect appears, then the ink-ejection-malfunction-nozzle detecting unit 83 determines that there are no ink ejection malfunction nozzles.

Contrarily, if there is a band in which density defect appears, then the ink-ejection-malfunction-nozzle detecting unit 83 (*a*) determines nozzle subgroups corresponding to a nozzle group corresponding to the band; (b) determines bands corresponding to the determined nozzle subgroups in the scanned image of the second test pattern; and (c) determines density distributions of the determined bands in a predetermined range from the aforementioned density defect position, determines a band in which density defect does not appear, and determines as an ink ejection malfunction nozzle a nozzle of the nozzle subgroup corresponding to the determined band.

Subsequently, nozzle information (nozzle number or the like) of the ink ejection malfunction nozzle is stored as data into the storage device 73.

As mentioned, an ink ejection malfunction nozzle is detected and set as a target of the correction process.

(b) Behavior for Printing

When receiving a print request, the control unit 81 causes the image processing unit 82 to perform an image process for an image specified by the print request, and thereby acquires image data of the image to be printed; and causes the image outputting unit 71 to transport a print sheet and print the image to be printed on the print sheet on the basis of the image data.

In this process, the correction processing unit 84 reads the data of the ink ejection malfunction nozzle from the storage device 73 and determines the ink ejection malfunction nozzle before starting the printing; and upon detecting a position of a print sheet using the line sensor 31, the correction processing unit 84 (*a*) determines a nozzle corresponding to each pixel in the aforementioned image, (b) determines an ink ejection malfunction position corresponding to the ink ejection malfunction nozzle in the aforementioned image, and (c) performs the correction process of the ink ejection malfunction position for the ink ejection malfunction nozzle. Subsequently, the control unit 81 performs the aforementioned printing on the basis of the image data after the correction process.

As mentioned, in the aforementioned embodiment, the ink-ejection-malfunction-nozzle detecting unit 83 (*a*) sets plural nozzle groups so as to be shifted sequentially by one nozzle such that each of the plural nozzle groups includes nozzles with a predetermined first interval among nozzles of the recording head 1*a*, 1*b*, 1*c* or 1*d*, (b) prints using the recording head 1*a*, 1*b*, 1*c* or 1*d* a first test pattern that includes first bands respectively corresponding to the nozzle groups such that the first band includes thin lines respectively corresponding to the nozzles in the nozzle group, (c) sets plural nozzle subgroups so as to be shifted sequentially by one nozzle such that each of the plural nozzle subgroups includes nozzles with a predetermined second interval among the nozzles in each of the nozzle groups, (d) prints using the recording head 1*a*, 1*b*, 1*c* or 1*d* a second test pattern that includes second bands respectively corresponding to the nozzle subgroups such that the second band includes thin blank lines respectively corresponding to the nozzles in the nozzle subgroup and a correction process is performed for adjacent pixels of the thin blank lines, (e) acquires a scanned image of the printed first test pattern and a scanned image of the printed second test pattern, (f) detects a first band including density defect in the scanned image of the first test pattern, and (g) detects a second band not including density defect owing to the correction process in the scanned image of the second test pattern, among the plural second bands corresponding to the plural nozzle subgroups in the nozzle group of the detected first band and detects as the ink ejection malfunction nozzle a nozzle corresponding to the thin blank line in the second band not including density defect.

Consequently, using test patterns in which thin lines and thin blank lines corresponding to nozzles are intermittently arranged, an ink ejection malfunction nozzle can be properly detected at a low cost without a high-resolution image scanning device.

Further, it should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

INDUSTRIAL APPLICABILITY

For example, the present invention is applicable to an inkjet image forming apparatus.

The invention claimed is:

1. An image forming apparatus, comprising:

a recording head that ejects ink corresponding to an image to be printed, using arranged nozzles; and an ink-ejection-malfunction-nozzle detecting unit configured to detect an ink ejection malfunction nozzle among the nozzles;

wherein the ink-ejection-malfunction-nozzle detecting unit (a) sets plural nozzle groups so as to be shifted sequentially by one nozzle such that each of the plural nozzle groups includes nozzles with a predetermined first interval among the arranged nozzles, (b) prints using the recording head a first test pattern that includes first bands respectively corresponding to the nozzle groups such that the first band includes thin lines respectively corresponding to the nozzles in the nozzle group, (c) sets plural nozzle subgroups from the plural nozzle groups so as to be shifted sequentially by one nozzle such that each of the plural nozzle subgroups includes nozzles with a predetermined second interval among the nozzles in each of the nozzle groups, (d) prints using the recording head a second test pattern that includes second bands respectively corresponding to the nozzle subgroups such that the second band includes thin blank lines respectively corresponding to the nozzles in the nozzle subgroup and a correction process is performed for adjacent pixels of the thin blank lines, (e) acquires a scanned image of the printed first test pattern and a scanned image of the printed second test pattern, (f) detects a first band including density defect in the scanned image of the first test pattern, and (g) detects a second band not including density defect owing to the correction process in the scanned image of the second test pattern, among the plural second bands corresponding to the plural nozzle subgroups in the nozzle group of the detected first band and detects as the ink ejection malfunction nozzle a nozzle corresponding to the thin blank line in the second band not including density defect.

2. The image forming apparatus according to claim 1, wherein the ink-ejection- malfunction-nozzle detecting unit smoothes the scanned image of the first test pattern, and detects the first band including density defect in the smoothed scanned image of the first test pattern.

3. The image forming apparatus according to claim 1, further comprising a correction processing unit that performs the correction process corresponding to the ink ejection malfunction nozzle in the image.

* * * * *